(12) United States Patent
Ukigawa et al.

(10) Patent No.: US 7,457,850 B1
(45) Date of Patent: Nov. 25, 2008

(54) INFORMATION SERVER SYSTEM

(75) Inventors: Kazunori Ukigawa, Tokushima (JP); Hiroki Yamashita, Chiba (JP)

(73) Assignee: Justsystem Corporation, Tokushima (JP)

( * ) Notice: Subject to any disclaimer, the term of this patent is extended or adjusted under 35 U.S.C. 154(b) by 752 days.

(21) Appl. No.: 09/717,019

(22) Filed: Nov. 22, 2000

(30) Foreign Application Priority Data

Nov. 25, 1999 (JP) .................................. 11-333534

(51) Int. Cl.
G06F 15/16 (2006.01)
G06F 15/173 (2006.01)

(52) U.S. Cl. ....................................... 709/219; 709/224

(58) Field of Classification Search ................. 709/226, 709/225, 223, 203, 218–219, 224
See application file for complete search history.

(56) References Cited

U.S. PATENT DOCUMENTS

| | | | | |
|---|---|---|---|---|
| 5,708,780 A * | 1/1998 | Levergood et al. | .......... | 709/229 |
| 5,768,528 A * | 6/1998 | Stumm | .......... | 709/231 |
| 5,913,039 A * | 6/1999 | Nakamura et al. | .......... | 709/231 |
| 5,935,207 A * | 8/1999 | Logue et al. | .......... | 709/219 |
| 5,958,053 A * | 9/1999 | Denker | .......... | 726/1 |
| 5,960,429 A * | 9/1999 | Peercy et al. | .......... | 707/5 |
| 6,133,912 A * | 10/2000 | Montero | .......... | 715/716 |
| 6,195,622 B1 * | 2/2001 | Altschuler et al. | .......... | 703/2 |
| 6,268,849 B1 * | 7/2001 | Boyer et al. | .......... | 725/40 |
| 6,292,835 B1 * | 9/2001 | Huang et al. | .......... | 709/235 |
| 6,377,993 B1 * | 4/2002 | Brandt et al. | .......... | 709/227 |
| 6,600,817 B1 * | 7/2003 | Shaffer et al. | .......... | 379/199 |
| 6,615,251 B1 * | 9/2003 | Klug et al. | .......... | 709/218 |
| 6,698,021 B1 * | 2/2004 | Amini et al. | .......... | 725/105 |

(Continued)

FOREIGN PATENT DOCUMENTS

JP 09-121337 5/1997

(Continued)

OTHER PUBLICATIONS

IBM Corp, "SQL Reference", Copyright 1993, 1997, No. of pp. 16.*

Primary Examiner—Nathan Flynn
Assistant Examiner—J. Bret Dennison
(74) Attorney, Agent, or Firm—Sughrue Mion, PLLC

(57) ABSTRACT

A server device, which has a content storage section, a content provider, a program table provider, a request processor and the like and can be accessed by a plurality of client devices, is arranged on the Internet. The content provider has a list, in which information about contents with relevance to their transmission times are registered. The content provider reads out the contents from the content storage section based on the list. The request processor controls the content provider to sent the read contents to a client device which has sent a request for transmission of the contents. The program table provider provides the client device, whose request is processed by the request processor, with a program table storing classifications of contents with relevance to their corresponding transmission times. This program table includes information for setting reservation for transmission of contents. The client device, which has received the program table, inputs a request for transmission of contents in accordance with the program table, makes the server device to send the contents to the client device, and makes the server device to send the contents at a time which is reserved and set as transmission time in accordance with the program table.

4 Claims, 7 Drawing Sheets

U.S. PATENT DOCUMENTS

| | | | |
|---|---|---|---|
| 6,766,370 B2 * | 7/2004 | Glommen et al. | 709/224 |
| 6,778,982 B1 * | 8/2004 | Knight et al. | 707/3 |
| 7,272,639 B1 * | 9/2007 | Levergood et al. | 709/218 |
| 2001/0020242 A1 * | 9/2001 | Gupta et al. | 707/501.1 |
| 2002/0147772 A1 * | 10/2002 | Glommen et al. | 709/203 |
| 2004/0260807 A1 * | 12/2004 | Glommen et al. | 709/224 |
| 2006/0095526 A1 * | 5/2006 | Levergood et al. | 709/206 |
| 2007/0198707 A1 * | 8/2007 | Boyd et al. | 709/224 |
| 2008/0109374 A1 * | 5/2008 | Levergood et al. | 705/75 |

FOREIGN PATENT DOCUMENTS

| | | |
|---|---|---|
| JP | 09-160666 | 6/1997 |
| JP | 09-163344 | 6/1997 |
| JP | 10-207838 | 8/1998 |
| JP | 11-096098 | 4/1999 |
| JP | 11-261975 | 9/1999 |
| JP | 2000-138969 | 5/2000 |
| JP | 2001-111504 | 4/2001 |
| WO | WO 98-44433 | 10/1998 |

* cited by examiner

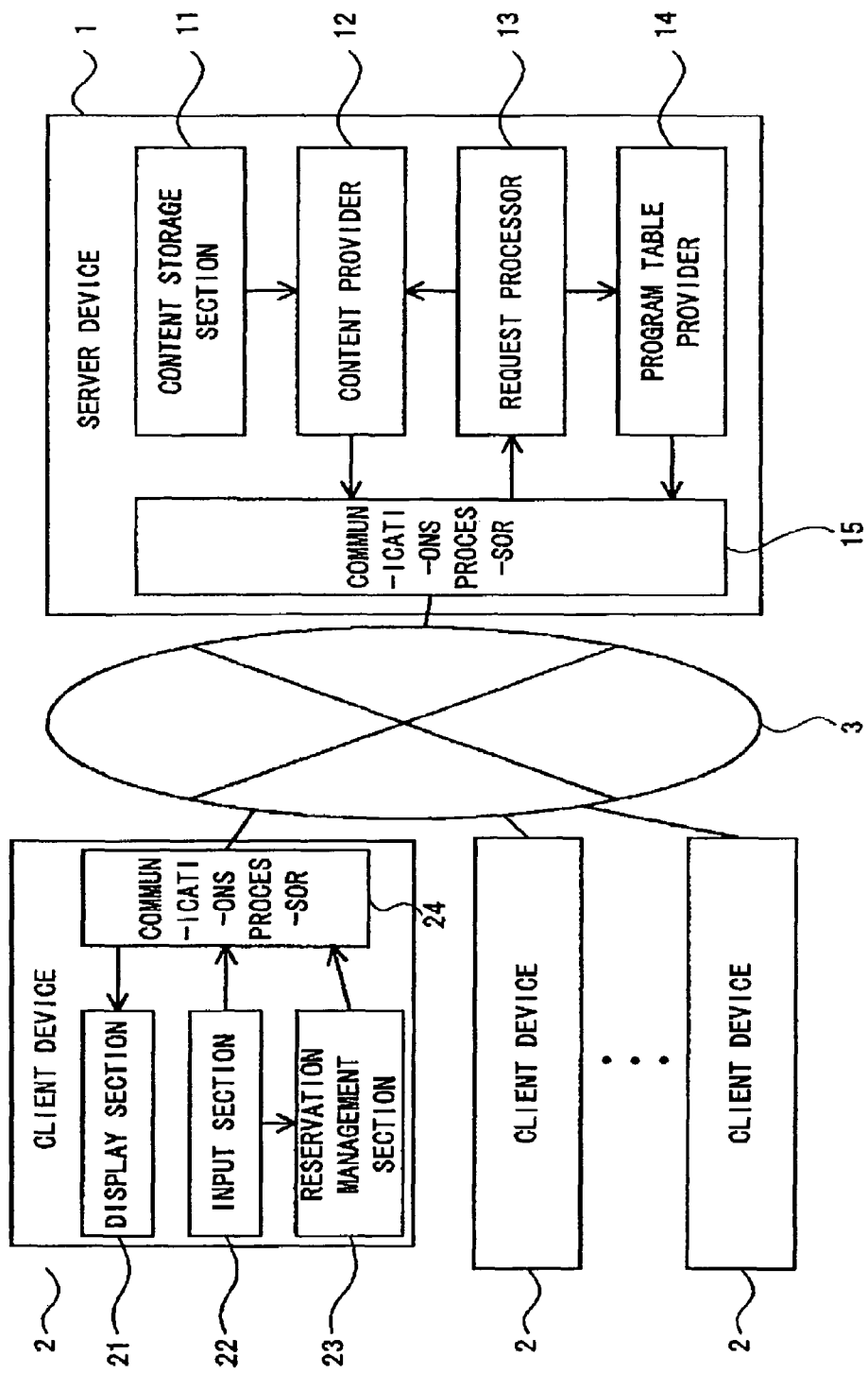

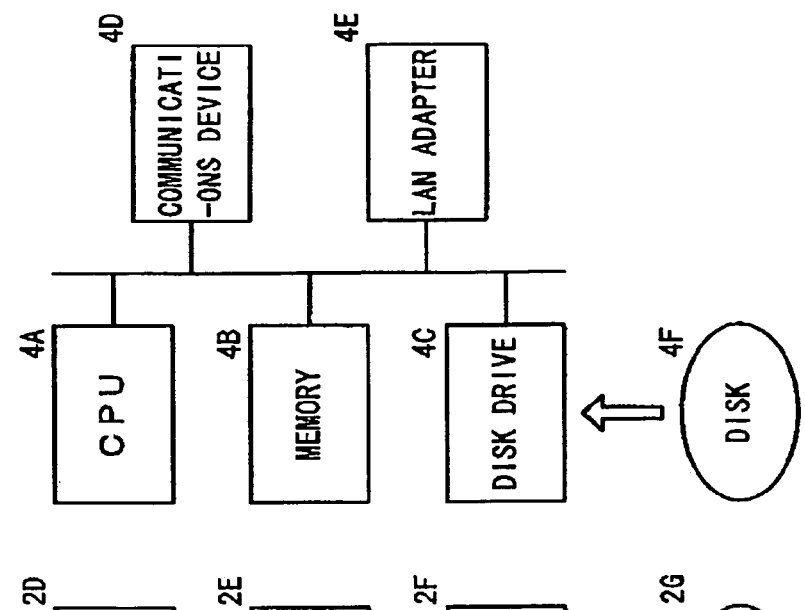
FIG. 9
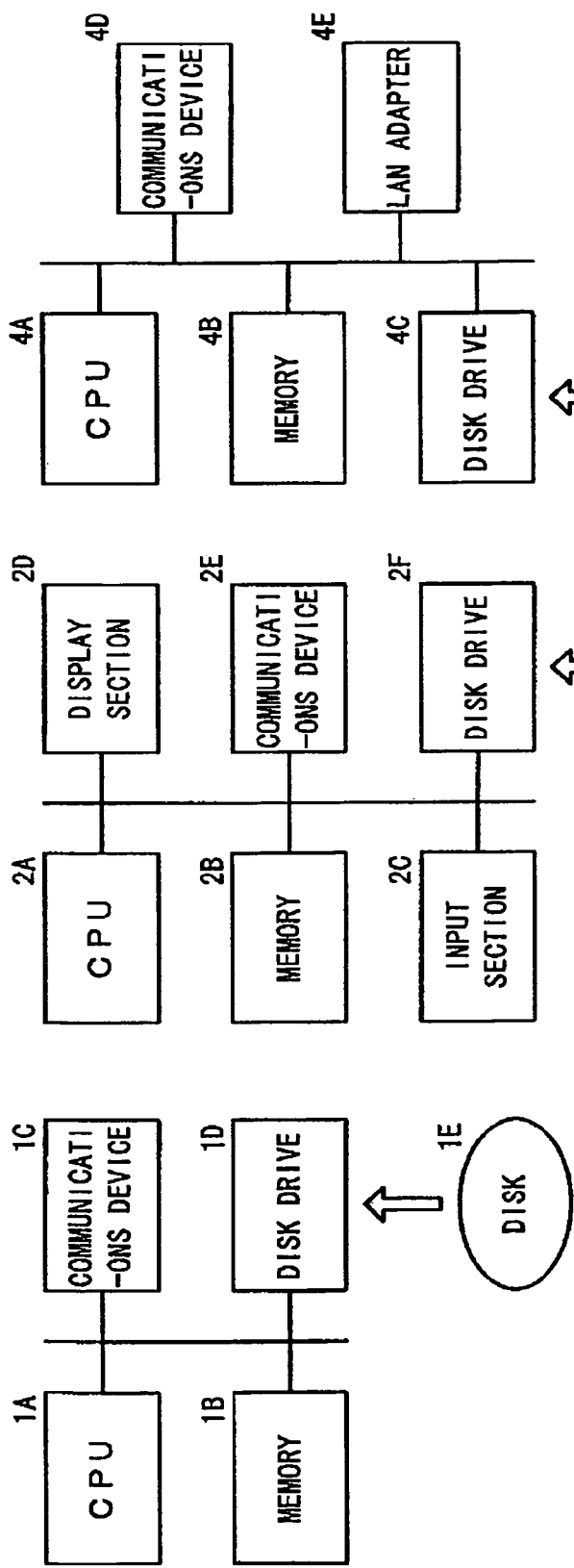
FIG. 2B
FIG. 2A

FIG. 3

| PROGRAM NAME | TRANSMISSION TIME | ADDRESS |
|---|---|---|
| A A A A A | 19:00~19:30 | aaaaa |
| B B B B B | 19:30~20:00 | bbbbb |
| C C C C C | 20:00~21:00 | ccccc |
| ⋮ | ⋮ | ⋮ |

FIG. 4A

XX (MONTH) XX (DATE)  [RECEIVE]  [SET]  [CLOSE]

| PROGRAM NAME | TRANSMISSION TIME | REFER | UPDATE | RESERVE |
|---|---|---|---|---|
| A A A A A | 19:00~19:30 | ☑ | ☑ | ⦿ |
| B B B B B | 19:30~20:00 | ☑ | ☐ | ○ |
| C C C C C | 20:00~21:00 | ☐ | ☐ | ○ |

| TIME DIFFERENCE | AREA |
|---|---|
| . . . | . . . |
| 0 | JAPAN, KOREA, ... |
| -1 | SINGAPORE, ... |
| . . . | . . . |

FIG. 7

INFORMATION SERVER SYSTEM

BACKGROUND OF THE INVENTION

1. Field of the Invention

The present invention relates to a system and method for serving information through the Internet.

2. Description of the Related Art

In recent years, with the development of computer and data communications technologies, those contents to be provided through the Internet have increased in number with enhanced quality and quantity. This results from the heart of Internet, as information serving means for serving information to receivers regardless of the locations of the receivers at any time desired, wherein the entry barrier on the side of information senders is quite low.

The contents (information) to be provided through the Internet are, generally, transmitted in response to a request from a user as a receiver, unlike the cable and wireless television broadcasting which has conventionally been utilized as the information serving means. Of those contents to be provided through the Internet, the commercial contents are frequently updated because of their necessity.

Since the commercial contents to be provided through the Internet need to be transmitted frequently, the following problems arose, as will be explained below.

The first problem is that a user utilizing the contents can not easily be aware of the time when the data of the contents to be provided through the Internet are to be updated. Hence, the user accesses the contents when he/she thinks the contents are updated in accordance with information, such as the last updated date and time, etc. as shown by the content provider. However, the user may miss the right time to access the updated content, or the user may repeatedly access the contents which have not been updated for a while, because the contents are not necessarily updated periodically.

The second problem is that an advertiser, who would like to run an advertisement (banner) to be provided through the Internet, can not easily determine in which contents the advertisement should be placed. Conventionally, such an advertiser refers to characteristics of users who have accessed the contents so as to determine whether to place the advertisement in the contents. However the information regarding the number of accesses or characteristics of users having accessed contents may be modified according to the intention of the content provider. Such information is not to represent whether the contents are actually observed. Therefore, such information is not really worth obtaining for the advertiser.

SUMMARY OF THE INVENTION

An object of the present invention is to provide a system wherein a user does not miss an appropriate timing when to read updated information to be provided through a network and a user needs not access information which has not been updated yet.

Another object thereof is to provide a system which lets an advertisement provider easily determine whether to put an advertisement in information to be provided through a network.

In order to accomplish the above objects, it is accordingly an object of the present invention to provide an information server system which comprises a server device transmitting information in response to a request, and at least one client device being connected to the server device and sending a request for transmission of information to the server device, wherein:

the server device includes schedule management means for managing relevance between classifications of information and transmission times of the information, request receiving means for receiving, from the client device, a request for transmission of information, request processing means for processing the request received by the request receiving means, information providing means for referring to the schedule management means, and for selecting classified information corresponding to a present time, and also for providing the selected information, and information sending means for sending, through the network, the information provided by the information providing means to a predetermined client device whose request has been processed by the request processing means; and the at least one client device includes request sending means for sending a request for transmission of information to the server device through the network;

information receiving means for receiving the information sent from the information sending means through the network; and information outputting means for outputting the information received by the information receiving means.

In the above-described information server system, transmission times of information to be transmitted are set according to classifications, and the information is provided. Hence, the user of the client device needs only to send a request for transmission of information at the timing the information of a desired classification is to be transmitted. In this structure, the user needs not access the server device repeatedly to monitor whether the information is updated.

Since information is provided in accordance with transmission times according to the classifications. Hence, it is predictable who to access the information to be provided. This enables an advertiser to easily determined whether to place an advertisement in information provided by the server device. Furthermore, the request processing means calculates the number of processed requests according to the classifications of information, thereby the advertiser can easily determined whether to place an advertisement.

In the above information server system:

the schedule management means may further manage relevance between information representing areas and time zones of the respective areas;

the request processing means may include area determination means for determining in which area at least one client device having sent a request for transmission of information exists; and the information providing means may select and provide classified information in accordance with a present time in a time zone of the area which is determined by the request processing means.

According to this structure, even if the time zone of the area where the client device exists differs from the time zone of the area where the server device exists, optimum contents can be provided to the client device in accordance with the time of the area of the client device.

In the above information server system:

the server device may further include schedule information sending means for sending schedule information representing relevance between classifications of information and transmission times of the information to the at least one client device through the network;

the at least one client device may further include
schedule information receiving means for receiving schedule information sent from the schedule information sending means through the network, and
request inputting means for inputting a request for transmission of information from the server device, in accordance with the schedule information received by the schedule information receiving means. In this case,
the request sending means may send a request for transmission of information to the server device based on an input from the request inputting means.

In the above structure, there is provided the request inputting means which can set the time to transmit a request for transmission of information. By doing so; the user of the client device can obtain information without monitoring whether it is the transmission time in which the information of a desired classification is transmitted. Besides, having set the transmission time, the user does not miss the appropriate timing in which updated information is transmitted.

In the above information server system may further comprise an intermediate device which has at least one client device thereunder, and is connected to the server device through the network, and intermediates entire data transmissions between the at least one client device and the server device.

In this case the intermediate device may include
schedule management means for managing schedule information representing substantially same contents as the relevance between the classifications of information and the respective transmission times of the information managed by the schedule management means,
information storage means for storing information provided by the information providing means in one of the at least one client device under the intermediate device, and
the request processing means for processing a request, for transmission of information, received from the at least one client device under the intermediate device, and for providing corresponding information to the at least one client device; and
the request processing means may
refer to the schedule management means so as to determine whether the information requested to be transmitted by the at least one client device is stored in the information storage means,
read out, when determined that the requested information is stored in the information storage means, the requested information from the information storage means, and provides the at least one client device with the read information, without sending a request for transmission of the information to the server device through the network, and
send the request, when determined that the request information is not stored in the information storage means, to the server device through the network, and control the information providing means to provide the requested information.

Having thus structured the intermediate device, when the same information is requested to be transmitted from a plurality of client devices under the intermediate device, it is not necessary to repeatedly access the server device for retrieving the same information.

In order to accomplish the above-described objects according to the second aspect of the present invention, there is provided an information server system which transmits information to at least one client device which has sent through a network a request for transmission of the information, the system comprising:
schedule management means for managing relevance between classifications of information and transmission times of the information;
information providing means for referring the schedule management means, and selecting classified information corresponding to a present time, and also for providing the classified information to the at least one client device; and
information transmission means for transmitting the information selected and provided by the information providing means to the at least one client device, which has sent the request, through the network.

In order to accomplish the above-described objects, according to the third aspect of the present invention, there is provided a method for providing information, in a system comprising a server device and at least one client device connected to the server device through a network, for transmitting information from the server device to the at least one client device through the network in response to a request from the at least one client device, the method comprising the steps of:
managing relevance between classifications of information and transmission times of the information in the server device;
sending a request for transmission of information through the network from the at least one client device to the server device;
selecting in the server device classified information corresponding to a present time;
transmitting the selected information from the server device to the at least one client device, which has sent a request for transmission of the information, through the network; and
outputting the transmitted information from the at least one client device.

In order to accomplish the above-described objects, according to the fourth aspect of the present invention, there is provided a method for providing information to at least one client device which has requested transmission of the information; the method comprising the step of:
managing relevance between classifications of information and transmission times of the information; and
sending classified information corresponding to a present time to an information provider through the network.

In order to accomplish the above-described objects, according to the fifth aspect of the present invention, there is provided a server device which is connected to at least one client device through a network, the server device comprising:
schedule management means for managing relevance between classifications of information and transmission times of the information;
request receiving means for receiving a request for transmission of information from the at least one client device;
request processing means for processing the request received by the request receiving means;
information providing means for referring to the schedule management means, and selecting classified information corresponding to a present time, and for providing the selected information; and
information sending means for sending the information provided by the information providing means to a predetermined client device, through the network, whose request as been processed by the request processing means.

The schedule management means may further manage relevance between information representing areas and time zones of the respective areas;

the request processing means may include area determination means for determining in which area at least one client device having sent a request for transmission of information exists; and the information providing means may select and provide classified information corresponding to a present time in a time zone of the area determined by the area determination means.

The request processing means may further include counting means for counting a number of client devices which have sent a request for transmission of information or a umber of client devices to which the information sending means has sent requested information, according to the classifications of the information.

In order to accomplish the above-described objects, according to the sixth aspect of the present invention, there is provided a server device which is connected to at least one client device through a network, and includes a memory for storing a program and data, a processor for executing the program, and a communications device connected to the processor and for sending/receiving information to/from the at least one client device, wherein the server device:

manages relevance between classifications of information and transmission times of the information in the memory;

receives in the communications device a request for transmission of the information sent from the at least one client device through the network;

executes, using the processor, the program stored in the memory in response to the request received by the communications device, and selects classified information corresponding to a present time; and sends the information selected by the processor from the communications device to the at least one client device, which has sent the request, through the network.

In order to accomplish the above-described objects, according to the seventh aspect of the present invention, there is provided a client device connected to a server device through a network, the client device comprising:

request inputting means for inputting a request for transmission of information to be sent from the server device, in accordance with schedule information representing relevance between classifications of information and transmission times of the information;

request sending means for sending a request for transmission of information to the server device through the network based on an input from the request inputting means;

information receiving means for receiving information sent from the server device through the network; and information outputting means for outputting the information received by the information receiving means.

In the above client device, the request inputting means may include time setting means for setting a transmission time a request for transmission of information is sent to the server device, and input a request to the server device, at the transmission time set by the time setting means.

The request inputting means may:

further include information classification inputting means for inputting a classification of requested information, and time determination means for determining whether it is passed a transmission time of the requested information of the classification input by the information classification inputting means;

control the request sending means to send a request for transmission of information, when the time determination means determines that it is passed the transmission time of the requested information; and control the time setting means to set a transmission time in which a request for transmission of information is sent, when the time determination means determines that it is not passed the transmission time of the requested information.

The schedule information is one to be transmitted from the server device through the network.

In order to accomplish the above objects, according to the eighth aspect of the present invention, there is provided a client device which is connected to a server device through a network, and includes a memory for storing a program and data, a processor for executing the program, an input device and an output device both being connected to the processor, and a communications device for sending/receiving information to/from the server device, wherein the client device:

inputs through the input device a request for information to be sent from the server device, in accordance with schedule information representing relevance between classifications of information and transmission times of the information;

sends the request input through the input device the communications device to the server device through the network;

receives in the communications device information which is sent from the server device through the network in response to the request; and outputs the information received by the communications device from the output device.

In order to accomplish the above objects, according to the ninth aspect of the present invention, there is provided an intermediate device which is connected to a server device through a network and has at least one client device thereunder, the intermediate client device comprising:

schedule management means for managing schedule information representing substantially same contents as relevance between classifications of information and transmission times of the information managed in the server device;

information storage means for storing information provided by the server device in the at least one client device under the intermediate device; and request processing means for processing a request, for transmission of information, sent from the at least one client device, and for providing the at least one client device with corresponding information, and wherein the request processing means refers to the schedule management means, and determines whether information requested from the at least one client device is stored in the information storage means, reads out requested information from the information storage means and provides the at least one client device with the read information, without sending the request to the server device through the network, when determined that the requested information is stored in the information storage means, and sends the request to the server device through the network, controls the server device to transmit corresponding information, and provides the at least one client device, when determined that requested information is not stored in the information storage means.

In order to accomplish the above objects, according to the tenth aspect of the present invention, there is provided an intermediate device which is connected to a server device through a network, and includes at least one client device thereunder, a memory for storing a program and data, a processor for executing the program, and a commnnications device connected to the processor and for sending/receiving information to/from the at least one client device, wherein:

the intermediate device manages in the memory schedule information representing substantially same contents as relevance between classifications of information and transmission times of the information managed in the server device, and stores in the memory information provided from the server device to the at least one client device; and the processor refers, when received a request for transmission of information from the at least one client device, to the schedule information managed in the memory, and determines whether information corresponding to the request is stored in the memory provides the at least one client device which has sent the request with the information corresponding to the request, without sending the request to the server device through the network, when determined that the requested information is stored in the memory, and sends the request to the server device through the network, controls the server device to transmit information corresponding to the request, and provides the at least one client device with the transmitted information, when determined that the requested information is not stored in the memory.

In order to accomplish the above objects, according to the eleventh aspect of the present invention, there is provided a computer readable recording medium which stores a program which makes a computer device, connected to a plurality of client devices through a network, function as:

schedule management means for managing relevance between classifications of information and transmission times of the information;

request receiving means for receiving a request, for transmission of information, sent from one of the plurality of client devices;

request processing means for processing the request received by the request receiving means;

information providing means for referring to the schedule management means, and for selecting classified information corresponding to a present time, and also for providing the selected information; and information sending means for sending the information provided by the information providing means to the one of the plurality of client devices whose request has been processed by the request processing means through the network.

In order to accomplish the above objects, according to the twelfth aspect of the present invention, there is provided a computer readable recording medium which stores a program which makes a computer device, connected to a server device through a network, function as:

request inputting means for inputting a request, for transmission of information, transmitted from the server device on the network, in accordance with schedule information representing relevance between classifications of information and transmission times of the information;

request sending means for sending a request for transmission of information to the server device through the network based on an input from the request inputting means;

information receiving means for receiving information sent from the server device through the network; and information outputting means for outputting the information received by the information receiving means.

In order to accomplish the above objects, according to the thirteenth aspect of the present invention, there is provided a computer readable recording medium storing a program which makes a computer device, which is connected to a server device through a network and has at least one client device thereunder, function as:

schedule management means for managing schedule information representing substantially same contents as relevance between classifications of information and transmission times of the information managed by the server device on the network;

information storage means for storing information sent form the server device in the at least one client device; and request processing means for sending a request, for transmission of information, sent from the at least one client device, to the server device, and wherein the request processing means refers to the schedule management means, and determines whether information requested from the at least one client device is stored in the information storage means, reads out information corresponding to the request and provides the read information to the at least one client device, without sending the request to the server device through the network, when determined that the requested information is stored in the information storage means, and sends the request to the server device through the network, and controls the information providing means to transmit the requested information, when determined that the requested information is not stored in the information storage means.

In order to accomplish the above objects, according to the fourteenth aspect of the present invention, there is provided a program data signal which is embodied in a carrier wave and transmitted through a communications path, the signal including segments for making a computer device, which is connected to a plurality of terminal devices through a network, function as:

incentive providing means for providing a predetermined incentive to at least a part of the terminal devices which have requested a particular service to be provided;

request frequency counting means for counting a number of terminal devices which have requested a service to be provided; and incentive modifying means for modifying contents of an incentive provided by the incentive providing means, in accordance with the number of terminal devices counted by the request frequency counting means.

In order to accomplish the above objects, according to the fifteenth aspect of the present invention, there is provided a program data signal which is embodied in a carrier wave and transmitted through a communications path, the signal including segments for making a computer, which is connected to a server device through a network, function as:

request inputting means for inputting a request for transmission of information to be transmitted from the server device on the network, in accordance with schedule information representing relevance between classifications of information and transmission times of the information;

request sending means for sending a request, for transmission of information, to the server through the network, based on an input from the request inputting means;

information receiving means for receiving information sent from the server device through the network; and information outputting means for outputting the information received by the information receiving means.

In order to accomplish the above objects, according to the sixteenth aspect of the present invention, there is provided a program data signal which is embodied in a carrier wave and transmitted through a communications path, the signal including segments for making a computer device, which is connected to a server device through a network on the network and has at least one client device thereunder, function as:

schedule management means for managing schedule information representing substantially same contents as relevance between classifications of information and transmission times of the information managed by the server device on the network;

information storage means for storing information provided from the server device in the at least one client device; and request processing means for sending a request, for transmission of information, sent from the at least one client device to the server device, and wherein the request processing means:

refers to the schedule management means, and determines whether information requested by the at least one client device is stored in the information storage means;

reads out the requested information from the information storage means, and provides the read information to the at least one client device, without sending the request to the server device through the network, when determined that the requested information is stored in the information storage means; and sends the request to the server device through the network, and controls the information providing means to provide the requested information, when determined that the requested information is not stored in the information storage means.

In the above-described inventions, the network is preferably Internet.

BRIEF DESCRIPTION OF THE DRAWINGS

These objects and other objects and advantages of the present invention will become more apparent upon reading of the following detailed description and the accompanying drawings in which:

FIG. 1 is a block diagram showing the structure of an information server system according to an embodiment of the present invention;

FIG. 2A is a diagram showing the structure of a server device shown in FIG. 1;

FIG. 2B is a diagram showing the structure of a client device shown in FIG. 1;

FIG. 3 is a diagram exemplifying a schedule list which a content provider shown in FIG. 1 has;

FIGS. 4A and 4B are diagrams each exemplifying a program table provided by a program table provider shown in FIG. 1;

FIG. 7 is a diagram showing an example of a tame zone table which a request processor of FIG. 1 has;

FIG. 9 is a diagram showing the structure of a cache server device of FIG. 8.

DETAILED DESCRIPTION OF THE PREFERRED EMBODIMENTS

Figure 5:
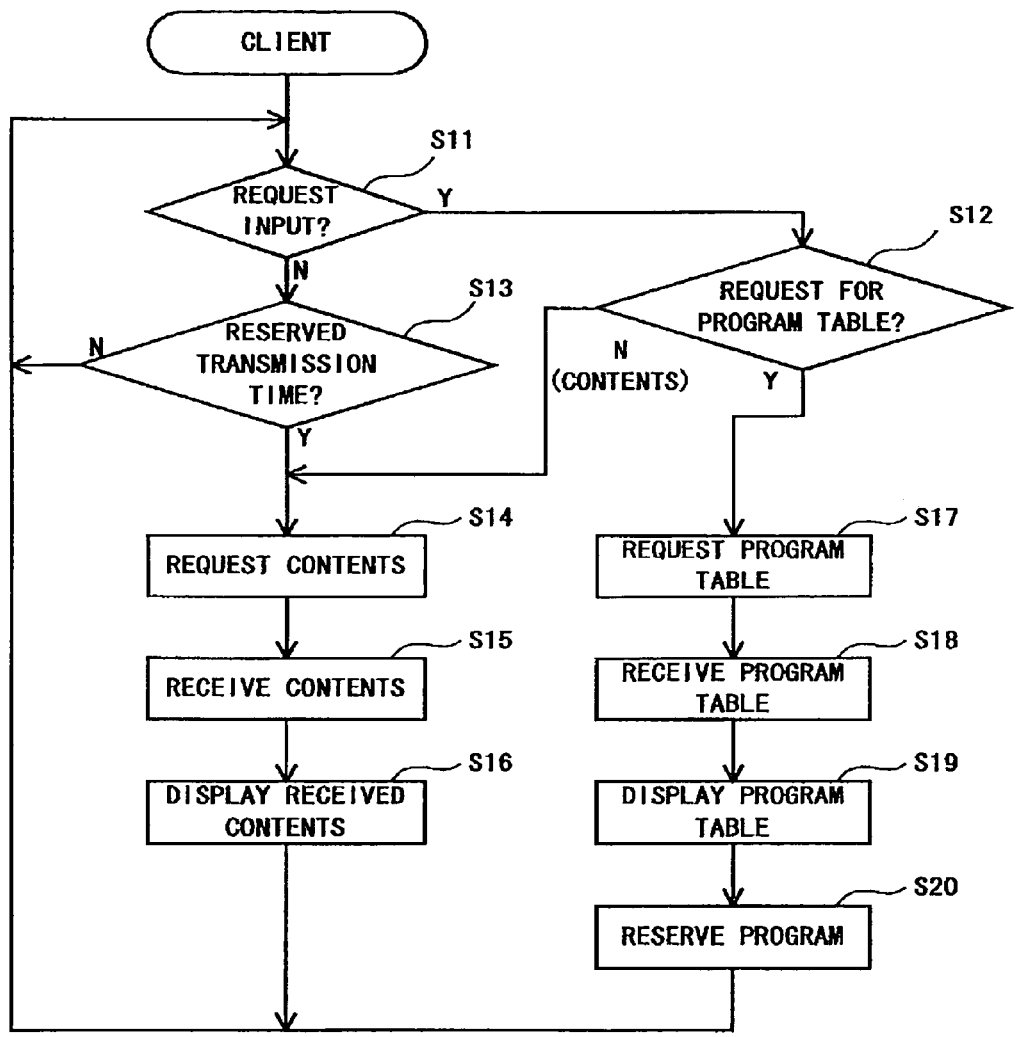
FIG. 5 is a flowchart showing a process which is carried out by a client device shown in FIG. 1.

Preferred embodiments of the present invention will now be explained with reference to the accompanying drawings.

FIG. 1 is a block diagram showing the structure of an information server system according to an embodiment of the present invention. As illustrated in FIG. 1, the information server system comprises a server device 1 and a plurality of client devices 2 which are connected to the server device 1 through the Internet 3.

The server device 1 includes those functions of a content storage section 11, a content provider 12, a request processor 13, a program table provider 14 and a communications processor 15. As the hardware for realizing the functions of the sections 11 to 15, the server device 1 includes, as shown in FIG. 2A, a CPU 1A, a memory 1B, a communications device 1C, a disk drive 1D, etc. A program for realizing the functions of the sections 11 to 16 is stored on a disk 1E, and retrieved therefrom. The program is read out by the disk drive 1D, and stored in the memory 1B. Otherwise, this program is embodied in a carrier wave so as to be transmitted from another computer device (any of the client devices 2 or any non-illustrative computer device) through the Internet 3. This program is then received by the communications device 1C, and stored in the memory 1B. The CPU 1A executes the program stored in the memory 1B, thereby to realize the functions of the sections 11 to 16.

The content storage section 11 stores various contents to be provided to any one of the client devices 2 through the Internet 3. A program name is affixed to its corresponding classification of contents, stored in the content storage section 11, and the contents are identified with their affixed program names.

The content provider 12 selects and retrieves any contents corresponding to a particular program name from the content storage section 11 in accordance the control of the request processor 13, and gives the retrieved contents to the communications processor 15. The contents are addressed to one of the client device 2 which has newly requested the transmission of the contents. The content provider 12 counts the number of requests for the transmission of the contents, in accordance with the control of the request processor 13, according to program names. Every time the contents are updated, the number of requests for the contents may be reset and be counted from an initial value.

In order to facilitate selecting and retrieving the contents from the content storage section 11, the content provider 12 has a schedule list shown in FIG. 3, for example. Each record included in this schedule list includes a program name, the transmission time, and an address in the content storage section 11. When to provide the contents, the content provider 12 refers to this schedule list, and reads out the contents, with a program name corresponding to the present time, at a corresponding address in the content storage section 11.

The request processor 13 processes any request for transmission of the contents or program table sent from the communications processor 15, as will be explained later. The request processor 13 controls the content provider 12 and the program table provider 14 based on the processed result of the request.

The program table provider 14 retrieves a program table stored therein, and gives the retrieved program table to the communications processor 15 in accordance with the control of the request processor 13. Such a program table is addressed to one of the client devices 2 which has requested for the transmission of the program table. The program table will more specifically be described later.

The communications processor 15 receives the request for the transmission of the contents or program table, as sent from one client device 2 through the Internet 3, and gives the received request to the request processor 13. The communications processor 15 sends, to the client device 2 through the Internet 3, the contents given by the content provider 12 and the program table given by the program table provider 14.

Each of the client devices 2 includes a display section 21, an input section 22, a reservation management section 23 and a communications processor 24. As the hardware for realizing the each of the sections 21 to 24, the client device 2 includes, as illustrated in FIG. 2B, a CPU 2A, a memory 2B, an input device 2C, a display device 2D, a communications device 2E, a disk drive 2F, etc. A program for realizing the functions of the sections 21 to 24 is stored on a disk 2G, read out by the disk drive 2, and stored in the memory 2B. Otherwise, this program is embodied in a carrier wave so as to be transmitted from any other computer device (including the server device 1) through the Internet 3, received by the communications device 2E, and stored in the memory 2B. The CPU 2A executes the program stored in the memory 2B, thereby to realize the functions of the sections 21 to 24.

The display section 21 displays the contents and the program table which are sent respectively by the content provider 12 and the program table provider 14 of the server device 1. The input section 22 inputs a request for transmission of contents and a program table, and gives the request to the communications processor 24. The request is to be sent to the request to the server device 1. The input section 22 inputs reservation setting for transmission of contents, on the basis of the program table displayed on the display section 21.

The reservation management section 23 manages the reservation, for transmission of the contents, which is set based on the program table. The reservation management section 23 monitors whether the current time coincides with the transmission time of the reserved contents. When determined that the current time coincides with the transmission time, the reservation management section 23 sends a request for transmission of the contents to the server device 1, to the communications processor 24.

The communications processor 24 receives the contents and the program table which are sent from the server device 1 through the Internet 3, and sends the received contents and the program table to the display section 21. The communications processor 24 sends, to the server device 1 through the Internet 3, a request for transmission of contents sent from the input section 22 or the reservation management section 23 and/or a request for transmission of the program table sent from the input section 22.

FIGS. 4A and 4H are diagrams each exemplarily showing a program table provided by the program table provider 14. As illustrated in FIG. 4A, this program table includes columns of "Program Name" and "Transmission Time", check boxes of "Reference" and "Update", and radio button type switches (only the appearance of the switches seems like radio button, but a plurality of buttons can possibly be selected) for reservation setting, whereby a check mark appears as the indication of reservation. As illustrated in FIG. 4B, those program names described in the column of "Program Name" are linked elements, which can be activated by being clicked so that the specific data of the contents to be provided as a program(s) can be displayed.

If the contents of a program name are received by the client device 2 and displayed on the display section 21, a check mark appears in a check box which corresponds to the program name. If the contents of the program name are once displayed on the display section 21 and the contents are updated since then, a check mark appears in a check box which corresponds to the program name. The contents are identified according to program names so that a check mark can appropriately appear in its check box, and the contents has update information to which a unique number is affixed every time the contents are updated.

The radio button-type switches are used as follows: By manipulation of the input section 22, a user selects a corresponding radio button-type switch for reservation setting and clicks on a button of "Set". By doing so, the reservation setting is registered in the reservation management section 23. In the reservation setting, a request for contents to be transmitted at the transmission time included in the row of the selected radio button-type switch is sent to the server device 1.

By manipulation of the input section 22, if the user clicks on a button of "Receive", a request for transmission of contents, which the server device 1 provides at that time, is input.

Operations of the information server system according to this embodiment will now be explained, in accordance with the functional block diagram of FIG. 1. Those processes which are respectively carried out by the client device 2 and the server device 1 will now be explained.

FIG. 5 is a flowchart showing the process which is carried out by the client device 2. The client device 2 determines whether a request for transmission of contents or a request for transmission of a program table is input through the input section 22 (Step S11). When determined either request is input, the client device 2 determines whether the request is one for requesting transmission of contents or a one for transmission of a program table (Step S12).

When determined that the request is one for requesting transmission of contents, the flow advances to the procedure of Step S14, as will be explained later. On the contrary, when determined that the request is one for requesting transmission of a program table, the flow advances to the procedure of Step S17, as will be explained later.

When determined neither request is input in Step S1, the reservation management section 23 determines whether the current time coincides with the transmission time of the contents of the reserved program (Step S13). When determined that the current time does not coincide with the transmission time, the flow returns to the procedure of Step S11. On the contrary, when determined that the current time coincides with the transmission time, the flow advances to the procedure of Step S14.

In Step S14, the input section 22 or the reservation management section 23 provides a request for transmission of contents to the communications processor 24, and then the communications processor 24 sends the provided request to the server device I through the Internet 3. The communications processor 24 receives the contents which are sent from the server device 1 through the Internet 3 in accordance with a procedure, as will be explained later (Step S15).

The communications processor 24 provides the display section 21 with the contents sent from the server device 1, and the display section 21 displays the contents (Step S16). After this, the user of the client device 2 can browse the contents provided by the server device 1, and the flow returns back to the procedure of Step S11.

In Step S17, the input section 22 provides the communications processor 24 with a request for transmission of a program table. The communications processor 24 sends the provided request to the server device 1 through the Internet 3.

Then, the communications processor 24 receives the program table which is sent from the server device 1 through the Internet 3 in accordance with a procedure, as will be explained later (Step S18).

The communications processor 24 gives the display section 21 the program table which has been sent from the server device 3, and the display section 21 displays this program table (Step S19). In the program table displayed on the display section 21, check marks appear in their corresponding check boxes of "Reference" and "Update", based on the program name and update information. By manipulation of the input device 22 in accordance with the program table displayed on the display section 21, the user of the client device 2 inputs a request for transmission of contents or performs reservation setting for transmission of contents (Step S20), and the flow returns to the procedure of Step S11.

The client device 2 controls the display section 21 to display the program table, which has been sent before, by manipulation of the input section 22. Having performed this, the inputting of the request for transmission of contents or the reservation setting for transmission of contents may be accomplished by manipulation of the input section 22 based on the displayed program table. A command for inputting a request for transmission of contents may be allotted into a particular key of the input section 22.

Figure 6:
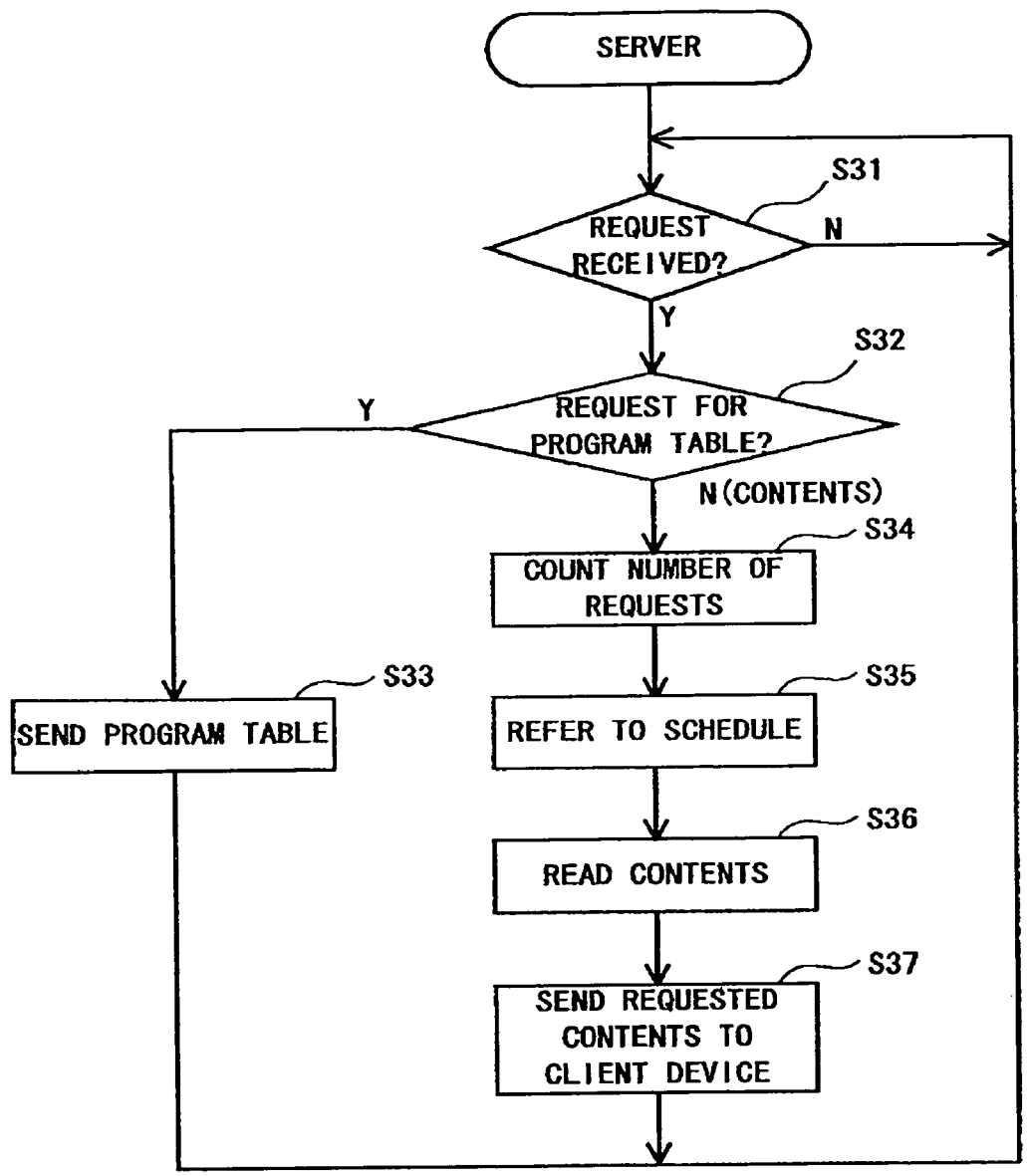
FIG. 6 is a flowchart showing a process which is executed by a server device shown in FIG. 1.

FIG. 6 is a flowchart showing the process which is carried out by the server device 1. In the server device 1, the request processor 13 determines whether the communications processor 15 has received a request for transmission of contents or a request for transmission of a program table (Step S31). When determined that the communications processor 15 has not received any request, the flow returns back to the procedure of Step S31. When determined either request is received by the communications processor 15, the request processor 13 further determines which one of the requests the communications processor 15 has received (Step S32).

When determined that the received request is one for requesting transmission of a program table, the program table provider 14 provides the communications processor 15 with a program table, stored in the program table provider 14, which is addressed to one client device 2 which has sent the request for transmission of the program table. The communications processor 15 sends the provided contents to the addressed client device 2 through the Internet 3 (Step S33), and the flow returns to the procedure of Step S31.

When determined that the received request is one for requesting contents, the content provider 12 refers to a schedule list stored therein, and counts the number of requests for contents of a program having a program name whose transmission time coincides with the current time (Step S34).

The content provider 12 further refers to a schedule list stored therein, and obtains an address which is stored in the content storage section 11 and indicates a program whose transmission time corresponds to the current time (Step S35). The content provider 12 reads out, from the content storage section 11, the contents with a program name whose transmission time coincides with the current time, in accordance with the obtained address (Step S36).

The content provider 12 provides the communications processor 15 with the contents, read out in Step S36, which are addressed to the client device which has sent the request for transmission of contents under the control of the request processor 13. The communications processor 15 sends the provided contents to the addressed client device 2 through the Internet 3 (Step S37), and the flow returns to the procedure of Step S31.

Then, in the information server system according to this embodiment, the process, wherein the client device 2 receives the contents sent from the server device 1 and controls the display section 21 to display the received contents, will now be explained with the following two examples.

Example 1

In this example, explanations will be made to the case where the client device 2 obtains a program table and receives the contents sent from the server device 1 at that time the client device 1 obtains the program table.

The user of the client device 2 inputs a request for transmission of a program table by predetermined manipulation of the input section 22. This request is sent to the server device 1 from the communications processor 24 through the Internet 3 and received by the communications processor 15 of the server device 1. The communications processor 15 provides the request processor 13 with this request. The request processor 13 determines that this request is one for requesting transmission of a program table, and assigns the request to the program table provider 14. The program table provider 14 sends the program table stored therein. The communications processor 15 sends the program table to the client device 2, which has requested the program table, through the Internet 3.

The communications processor 24 of the client device 2 receives the program table thus sent from the server device 1, and gives the received program table to the display section 21. The display section 21 then displays the program table. The user of the client device 2 clicks on the button of "Receive" on the displayed program table, by manipulation of the input section 22.

Upon this, the request for transmission of contents is sent to the server device 1 through the input section 22, the communications processor 24 and the Internet 3. This request is received by the communications processor 15 of the server device 1. The communications processor 15 gives this request to the request processor 13, and the request processor 13 determines that the request is one for requesting transmission of contents, thereby assigning the request to the content provider 12.

The content provider 12 refers to the schedule list stored therein, and obtains an address, in the content storage section 11, of a program whose transmission time corresponds to the current time. The content provider 12 reads out the contents at the obtained address from the content storage section 11, and sends the contents to the client device 2 which has requested the contents from the communications processor 15 through the Internet 3.

The communications processor 24 of the client device 2 receives the contents which are thus sent from the server device 1, and gives the received contents to the display section 21. The display section 21 displays the contents thereon. Then, the user of the client device 2 can browse the contents which are provided from the server device 1 in real time.

Example 2

In this example, explanations will be made to the case where the client device 2 receives contents from the server device 1 right at the time which has been set as the transmission time. Note that the process, wherein the client device 2 obtains the program table from the server device 1 and controls the display section 21 to display the obtained program table, is the same as that described in Example 1. The user of the client device 2 selects a radio button-type switch corresponding to the contents of a desired program name, by manipulation of the input section 22 in the state where the program table is displayed on the display section 21. Further, the user clicks on the button of "Set" on the display table, by manipulation of the input section 22, thereby to complete the reservation setting. The reservation thus set by the user is managed by the reservation management section 23, and the reservation management section 23 continuously monitors whether the transmission time of contents is to coincide with the set time.

When the reservation management section 23 determines that the transmission time of contents is to coincide with the set time, a request for transmission of contents is sent to the server device 1 from the reservation management section 23 through the communications processor 24 and the Internet 3. The communications processor 15 of the server device 1 receives this request. Note that the procedure, wherein the communications processor 15 of the server device 1 receives the information for requesting transmission of contents, and the procedures following the above procedure are the same as those described in Example 1.

As explained above, in the information server system according to this embodiment, the transmission times in which the contents are transmitted from the server device 1 are set according to their program names. According to the structure of the system, the user of the client device 2 needs just to send a request for transmission of desired contents the contents are to be transmitted in accordance with the obtained program table. Hence, the user does not need to perform an unnecessary operation for frequently accessing the contents.

The time the desired contents are to be transmitted can be set based on the program table sent from the server device 1. Even if the user of the client device 2 does not monitor whether the current time coincides with the transmission time, the desired contents can be obtained. Besides, having set the reservation, the user of the client device 2 does not miss the timing the updated contents are transmitted.

A program table includes check boxes of "Reference" and "Update". Thus, the user of the client device 2 can easily determine whether the user has viewed the contents of each program and, further, whether the user has viewed the contents after being updated. Hence, the user of the client device 2 can receive and view contents sent from the server device 1, without missing the right timing the contents to be updated are transmitted.

Each of the program names included in the program table is a linked element through which the user of the client device 2 can obtains the specific information about each program. The user of the client device 2 clicks on a program name on the program table displayed on the display section 21, by manipulation of the input section 22, thereby to acquire the specific contents. According to this structure, the user of the client device 2 can easily determine whether to access a particular program.

Because the transmission times of the contents from the server device 1 are set according to programs, it is predictable who (e.g., any of those who may use the contents for business sake or for their own interests) to access the contents. Thus, an advertisement provider can easily determine whether to provide an advertisement in the contents of each program.

The content provider 12 counts the number of requests for transmission of contents, and sums up the number for each program name. By doing so, data showing the access frequency how many times the contents of a particular program are viewed. Therefore, the advertisement provider can easily determine in which program an advertisement should be provided in the contents.

After obtained the time to transmit the contents, i.e., having set the contents into a program and transmitted the contents to the client device 2 from the server device 1 through the Internet 3, in a case where contents including motion pictures possibly in real time are employed, the user of the client device 2 can have the feeling of obtaining the desired information in real time.

In the above-described embodiment, the content provider 12 selects and provides contents which are created in advance and stored in the content storage section 11, based on the schedule list. However, it is not necessary that those contents which the content provider 12 selects and provides are created in advance and may be motion pictures which are photographed in real time, for example.

The content storage section 11 may store URLs (Uniform Resource Locators) specifying the location of desired contents, instead of storing the contents themselves. In this case, the content provider 12 may read out a particular URL from the content storage section 11, and obtain the contents from another server on the Internet 3 based on the read URL, so as to send the obtained contents to the client device 2.

In the above-described embodiment, only when a request for transmission of contents is sent from the client device 2, the content provider 12 provides the contents addressed to the client device 2 which has sent the request. In addition, the content provider 12 may also provide the contents to any of the client devices 2, which is still connected to the server device since the connection has been made between the client device 2 and the server device 1.

In the above-described embodiment, the content provider 12 refers to the schedule list when the procedure is carried out under the control of the request processor 13, and sums up the number of requests for transmission of contents for every program name. However, the content provider 12 may sum up the number of client devices 2 to which the content provider 12 have provided the contents, for every program name.

In the above-described embodiment, the program table includes the columns of "Program Name" and "Transmission Time" and, check boxes of "Refer" and "Update" and radio button-type switches for the reservation setting. However, the format of the program table is not limited to this. For example, a predetermined icon may be included right next to the program name whose contents are updated/not updated. According to this structure, the user of the client device 2 can be aware of whether the contents of each program name are updated. Further, if the contents are updated every time transmitted, there is no need to include in the program table any information showing whether or not the contents are updated.

In the above-described embodiment, having selected a particular radio button-type switch in the program table, a request for transmission of contents with a program name corresponding to the switch is sent, thereby to accomplish the reservation setting. However, the method for setting the reservation is not limited to this. For example, the user of the client device 2 may perform the reservation setting by manipulation of a predetermined key(s) of the input section 22.

In the above-described embodiment, the client device 2 obtains a program table, by inputting a request for the program table so as to control the server device 1 to send the table thereto. However, the method for obtaining the program table is not limited to this. For example, regardless of the request, the server device 1 may send an e-mail including a program table and being addressed to a pre-registered address. Otherwise, the server device 1 may provide the program table in response to a request from any other server device on the Internet 3, or utilize a BBS (Bulletin Board System) which allows user to receive the program table. Furthermore, the program table may be stored in a recording medium, such as CD-ROM, etc., and sent to the user of the client device 2. As long as the program table is not used for the reservation setting in its format, the table may be printed on paper magazines and read by the user of the client device 2.

In the above-described embodiment, the content provider 11 of the server device 1 is to provide the client device 2 with the contents if its transmission time coincides with the current time. However, the contents may possibly be provided to the client device 2 form the server device 1 as needed, if the current time has passed its transmission time.

In the system having such a structure, when inputting a request for transmission of the contents through the input section 22, the information (in this case, program name, transmission time, etc.) about the contents may be input at the same time. At this time, the client device 2 sends the information about the contents together with the request for transmission of the contents to the server device 1.

In the server device 1, the request processor 13 provides the content provider 12 with the information about the contents. Then, the content provider 12 reads out the contents from the content storage section 11 in accordance with the information, from the request process 13, and provides the client device 2 with the read contents through the communications processor 24 and the Internet 3.

In each of the client devices 2, there may be provided means for determining whether contents of a particular program have already been sent from the server device 1, i.e., whether the current time has passed the transmission start time of the contents, in accordance with input information about the contents and a program table received in advance. When determined that the contents have already been provided, a request input through the input section 22 and the information about the contents are sent to the sever a device 1. On the contrary, when determined that the contents have not been provided, the CPU of the client device 2 may control the reservation management section 23 to perform reservation setting for transmission of the corresponding contents.

In the above-described embodiment, the explanations have been made to the system under the assumption that the server device 1 and the client device 2 are in the same time zone. However, a user can connect to the Internet 3 anywhere all over the world regardless of the country, area, etc. of the user. Hence, if the client device 2 is in an area where there is a difference in time between the area and an area of the server device 1, for example, if the client device 2 is in Japan where it's the daytime, the server device 1 is somewhere in U.S. where it's the night time. In such a case, the contents of each program can not be provided at a desired time.

The server device 1 may provide the client device 2 with the contents of each program under the consideration of the area of the client device 2. In order to do this, in the server device 1, the request processor 13 can contain a time-zone table which is shown in FIG. 7, for example. As illustrated in FIG. 7, the time-zone table stores information regarding areas all over the world, and their time differences with respect to the area where the server device 1 exists, in a manner corresponding with each other.

The above-described procedure of Step S35 in FIG. 6 is changed as follows: The request processor 13 determines in which area the client device 2 which has sent the request to the server device I is located. If there is a time difference between the area of the client device 2 and the area of the server device 1, the present time clocked in the server device 1 is adjusted in accordance with the time difference. With reference to the schedule list stored in the server device 1, the request processor 13 obtains an address corresponding to the adjusted present time from the content storage section 11.

When the request processor 13 determines in which area the client device 2 is located, it may refer to the location of an access point of the client device 2 for connecting to the Internet 3, for example. The request processor 13 may also refer to a country code (for example, the country code may be "jp", if the country of the client device 2 is Japan) representing a country name included in the address of the client device 2.

Having thus formed the structure, even when the client device 2 is located in any area all over the world, the appropriate contents are provided from the server device 1 in accordance with the time of the area. The management of the time zones is achieved in the server device 1, thus only one program table to be provided to the client device 2 is necessary.

In the above-described embodiment, it has been assumed that the client device 2 is directly connected to the Internet 3. However, there is any other client device(s) which is connected to the Internet through a LAN (Local Area Network). In such a case, what is so-called a cache server device is arranged at the entrance of the Internet from a LAN, a network system in which the cache server device intermediates data transmission between the server device and the client device which is under the server device.

Figure 8:
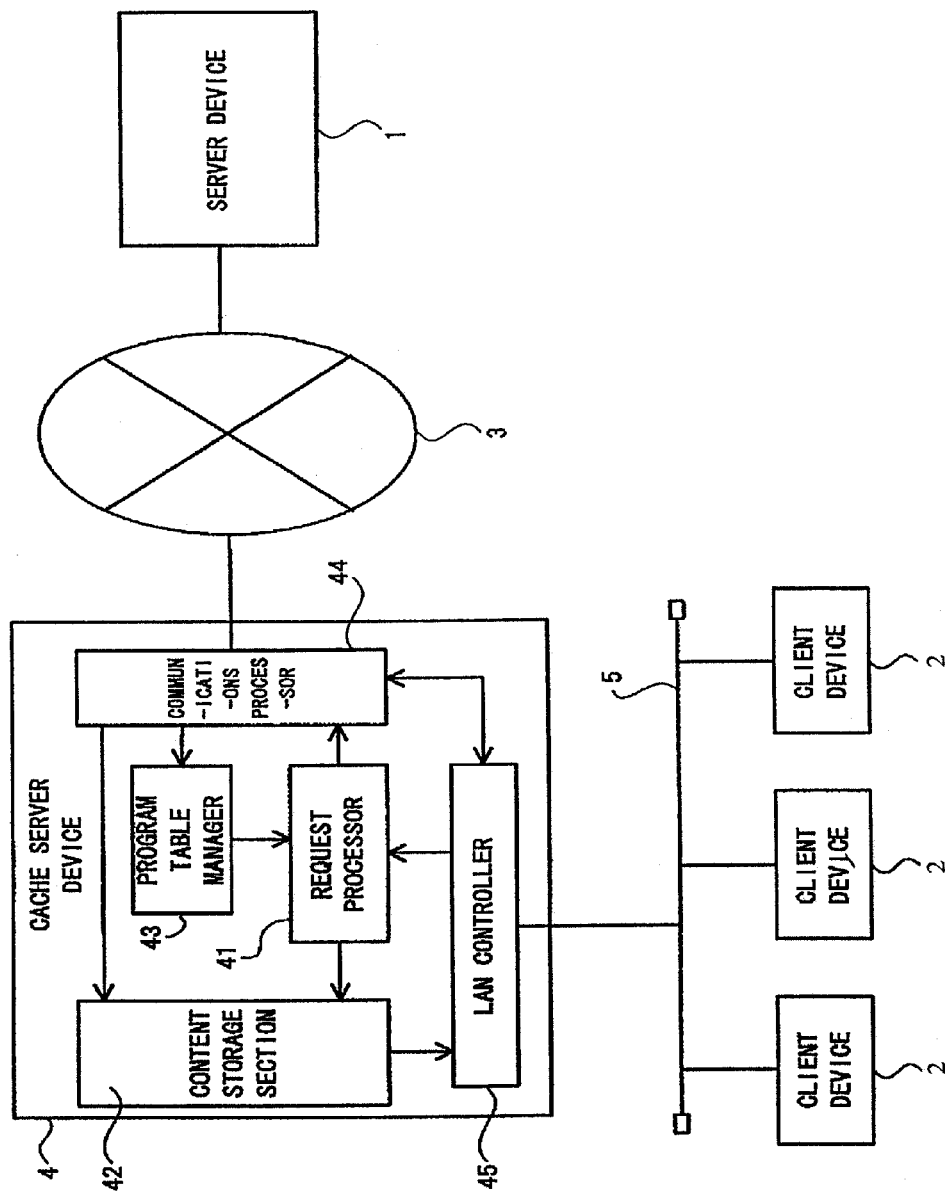
FIG. 8 is a block diagram showing the structure of an information server system according to another embodiment of the present invention.

FIG. 8 is a block diagram showing the structure of the network system having such a cache server device. As illustrated in FIG. 8, the cache server device 4 includes a request processor 41, a content storage section 42, a program table management section 43, a communications processor 44, and a LAN controller 45. As the hardware for realizing the functions of the sections 41 to 45, the cache server device 4 includes a CPU 4A, a memory 4B, a disk drive 4C, a communications device 4D, and a LAN adapter 4E, etc. The program for realizing the functions of the sections 41 to 45 is stored in a disk 4F, and read out by the disk drive 4C so as to be stored in the memory 2B. Otherwise, this program is embodied in a carrier wave, and transmitted from another computer device (server device 1) through the Internet 3. Further, the program is received by the communications device 4D, and stored in the memory 4B. The CPU 4A executes the program stored in the memory 4B, thereby to realize the functions of the sections 41 to 45.

The structures of the server device 1 and client device 2 shown in FIG. 8 are substantially the same as those included in the system described in FIG. 1. However, the communications processor 24 of the client device 2 is one for performing communications through a LAN 5. Particularly, the communications device 2E includes a LAN card or the like. In the cache server device 4, the communications processor 44 is connected to the server device 1 through the Internet 3. The LAN controller 45 is connected to a plurality of terminal devices 2 through the LAN 5.

Operations of this system will now be described, in accordance with the functional block diagram shown in FIG. 8. In the client device 2, once a request for transmission of contents or a request for transmission of a program table is input, the request is provided to the request processor 41 through the LAN 5 and the LAN controller 45. The request processor 41 determines what kind of request, i.e. whether to request a program table or contents of a program, the received request is.

In the case where the request is one for requesting transmission of a program table, the request processor 41 controls the communications processor 44 to send the request to the server device 1 through the Internet 3. The communications processor 44 controls the LAN controller 45 to send the program table, sent from the server device 1 through the Internet 3, to the client device 2 having sent the request for the program table, through the LAN 5. At the same time, the communications processor 44 provides the program table management section 43 with the sent program table. Then, the program table management table 43 manages the most-recently updated program table at any time.

On the contrary, in the case where the request is one for requesting transmission of contents, the request processor 41 refers to the program table managed by the program table management section 43. Further, the request processor 41 determines whether the contents which have been sent from the server device 1 at the present moment have already been stored in the content storage section 42, as will be explained later.

When determined that the contents have already been stored therein, the request processor 41 controls the content storage section 42 to provide the LAN controller 45 with the contents corresponding to the request, i.e. the same contents as those having been transmitted from the server device 1 at the present moment.

When determined that the contents have not been stored, the request processor 41 controls the communications processor 44 to provide the server device 1 through the Internet 3 with a request for transmission of contents. The communications processor 44 controls the LAN controller 45 to provide through the LAN 5 the client device 2, having sent the request, with the contents sent from the server device 1 through the Internet 3. At the same, the communications processor 44 stores the sent contents in the content storage section 42. Thereafter, for any request for the same contents, those stored in the content storage section 42 are sent to any of the client device 2. Hence, the cache server device 4 needs not repeatedly access the server device 1, when retrieving the same information.

In the above-described embodiments, the explanations have been made to the system, wherein the server device 1 and the client device 2 are connected with each other through the Internet 3. However, the preset invention may be adapted to the system, wherein a server device and at least one client device are connected through a closed-commercial network. In addition, the present invention may be adapted to the system, wherein at least one cellular phone is employed as a terminal device to which various information are sent through a base station.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H11-333534 filed on Nov. 25, 1999, and including specification, claims, drawings and summary. The disclosure of the above Japanese Patent Application is incorporated herein by reference in its entirety.

What is claimed is:

1. A server device which is connected to at least one client device through a network; said server device comprising:

schedule management means for managing relevance between classifications of information and transmission times of the information and relevance between information representing areas and time zones of the respective areas;

request receiving means for receiving, from said at least one client device, a request for transmission of information, area determination means for determining in which area said at least one client device having sent a request for transmission of information exists;

information providing means for referring to said schedule management means, and for selecting classified information corresponding to a present time in a time zone of the area which is determined by said area determination means, and information sending means for sending, through the network, the information selected by said information providing means to a predetermined client device which has sent request for transmission of the information, wherein said information providing means further includes counting means for counting a number of client devices which have sent a request for transmission of information and a number of client devices to which said information sending means has sent requested information, according to the classifications of the information, and wherein when said information is updated, said counted number of client devices which have sent said request for transmission of information is reset to an initial value.

2. The server device according to claim 1, further comprising an information storage means for storing the information in advance, and wherein:

the schedule management means manages a relevance between an attribute of the information stored in the information storage means and a transmission time;

the information providing means selects information in which the transmission time is set to a current time in the time zone in the area, which is determined by the area determination means, among the information stored in the information storage means; and the information sending means sends the information selected by the information providing means to the client device which sends a request for transmission of information prior to the current time and is connected to the server device via a network.

3. A server device which is connected to at least one client device through a network; said server device comprising:

schedule management means for managing relevance between classifications of information and transmission times of the information and relevance between information representing areas and time zones of the respective areas;

request receiving means for receiving, from said at least one client device, a request for transmission of information;

area determination means for determining in which area said at least one client device having sent a request for transmission of information exists;

information providing means for referring to said schedule management means, and for selecting classified information corresponding to a present time in a time zone of the area which is determined by said area determination means, and information sending means for sending, through the network, the information selected by said information providing means to a predetermined client device which has sent a request for transmission of the information, wherein said information providing means further includes counting means for counting at least a number of client devices to which said information sending means has sent requested information, according to the classifications of the information, and wherein when said information is updated, said counted number of client devices which have requested said information is reset to an initial value.

4. The server device according to claim 3, further comprising an information storage means for storing the information in advance, and wherein:

the schedule management means manages a relevance between an attribute of the information stored in the information storage means and a transmission time;

the information providing means selects information in which the transmission time is set to a current time in the time zone in the area, which is determined by the area determination means, among the information stored in the information storage means; and the information sending means sends the information selected by the information providing means to the client device which sends a request for transmission of information prior to the current time and is connected to the server device via a network.

* * * * *